(12) United States Patent
Alter et al.

(10) Patent No.: US 8,960,089 B2
(45) Date of Patent: Feb. 24, 2015

(54) MULTI-LAYER, EXPANDABLE SLEEVE FOR A PRINTING PRESS CYLINDER, PARTICULARLY FOR FLEXOGRAPHIC PRINTING

(75) Inventors: Rolf-Mathias Alter, Echternach (LU); Patrick Freres, Echternach (LU); Oliver Bottler, Konz (DE)

(73) Assignee: Euro-Composites S.A., Echternach (LU)

( * ) Notice: Subject to any disclaimer, the term of this patent is extended or adjusted under 35 U.S.C. 154(b) by 59 days.

(21) Appl. No.: 13/825,672

(22) PCT Filed: Sep. 22, 2011

(86) PCT No.: PCT/EP2011/066542
§ 371 (c)(1),
(2), (4) Date: Jun. 21, 2013

(87) PCT Pub. No.: WO2012/038514
PCT Pub. Date: Mar. 29, 2012

(65) Prior Publication Data
US 2013/0260070 A1    Oct. 3, 2013

(30) Foreign Application Priority Data
Sep. 24, 2010  (LU) ......................................... 91 741

(51) Int. Cl.
*B41C 3/08* (2006.01)
*B41F 13/10* (2006.01)
(Continued)

(52) U.S. Cl.
CPC ....................................... *B41N 6/00* (2013.01)
USPC .......... 101/401.1; 101/375; 101/395; 492/49; 492/50

(58) Field of Classification Search
USPC ........ 101/375, 376, 401.1; 492/48, 49, 50, 52
See application file for complete search history.

(56) References Cited

U.S. PATENT DOCUMENTS 2,241,671 A   5/1941  Miller
3,549,468 A * 12/1970  Yoshino et al. ................ 428/117
(Continued)

FOREIGN PATENT DOCUMENTS

DE    2115156 C3    3/1982
DE    3543704 A1    6/1987
(Continued)

OTHER PUBLICATIONS
Int'l Preliminary Report on Patentability issued Apr. 4, 2013 in Int'l Application No. PCT/EP2011/066542.
(Continued)

Primary Examiner — Ren Yan
(74) Attorney, Agent, or Firm — Panitch Schwarze Belisario & Nadel LLP

(57) ABSTRACT

The invention relates to a multi-layer, expandable sleeve (100) for a printing press cylinder, particularly for flexographic printing. The sleeve has an inner layer (110) with a hard surface inner jacket (112), which defines a longitudinal axis (A) and the cavity for mounting on the cylinder, and an outer layer (130) with a cylindrical outer jacket (132) for carrying an outer shell, a printing plate or a separate outer sleeve, in particular. An intermediate layer (120), manufactured in the form of a lightweight honeycomb having honeycomb cells oriented radially (B) to the longitudinal axis (A), is provided between the inner jacket (112) and the outer jacket (132). According to the invention, the intermediate layer (120) comprises at least one honeycomb layer (122-1, 122-2, 122-3, 122-4, 122-5) consisting of shaped cured fiber composite honeycomb made of fiber material embedded in a resin matrix. This intermediate layer (120) in itself makes the essential contribution to the inner jacket (112) being able to expand radially away from the longitudinal axis (A) for mounting the sleeve (100) on the cylinder.

15 Claims, 3 Drawing Sheets

(51) Int. Cl.
  *B25F 5/02* (2006.01)
  *B41N 6/00* (2006.01)

(56) References Cited

U.S. PATENT DOCUMENTS

| | | | |
|---|---|---|---|
| 4,913,048 | A | 4/1990 | Tittgemeyer |
| 5,151,144 | A | 9/1992 | Chlupsa |
| 5,759,141 | A | 6/1998 | Schmitz |
| 6,691,614 | B2 | 2/2004 | Bell et al. |
| 2002/0046668 | A1 | 4/2002 | Bell et al. |
| 2003/0217661 | A1 | 11/2003 | Schnieders |
| 2006/0070540 | A1 | 4/2006 | Grieser et al. |
| 2006/0096098 | A1 | 5/2006 | Kurkinen et al. |

FOREIGN PATENT DOCUMENTS

| | | | |
|---|---|---|---|
| DE | 19533823 | A1 | 10/1996 |
| DE | 695 05 044 | T2 | 5/1999 |
| DE | 100 18 418 | A1 | 10/2001 |
| DE | 10018418 | A1 | 10/2001 |
| DE | 10054361 | A1 | 5/2002 |
| DE | 102004048634 | A1 | 4/2006 |
| EP | 0 683 040 | A1 | 11/1995 |
| EP | 0683040 | A1 | 11/1995 |
| EP | 1 361 073 | A2 | 11/2003 |
| GB | 1272550 | A | 5/1972 |
| WO | 2009/098644 | A2 | 8/2009 |

OTHER PUBLICATIONS

Int'l Search report issued on Dec. 23, 2011 in Int'l Application No. PCT/EP2011/066542.

Wiedemann, "Leichtbau: Band 2: Konstruktion," Springer London, Ltd., pp. 79-82 (2011).

\* cited by examiner

MULTI-LAYER, EXPANDABLE SLEEVE FOR A PRINTING PRESS CYLINDER, PARTICULARLY FOR FLEXOGRAPHIC PRINTING

CROSS-REFERENCE TO RELATED APPLICATION

This application is a Section 371 of International Application No. PCT/EP2011/066542, filed Sep. 22, 2011, which was published in the English language on Mar. 29, 2012, under International Publication No. WO 2012/038514 A1, the disclosure of which is incorporated herein by reference.

TECHNICAL FIELD

The present invention generally relates to a multi-layer sleeve for use on a cylinder of a rotary press, wherein the sleeve is expandable, i.e. its inside diameter can be increased. The invention particularly relates to a sleeve designed for flexographic printing, specifically for so-called variable-sleeve offset printing.

PRIOR ART

Such sleeves are generally used to change the printing plate rapidly and inexpensively. They eliminate the need for changing the rotating, driven printing press cylinder itself. In the prior art, the term "sleeve" encompasses both adapter sleeves, which are mounted on the cylinder to carry a further, thinner-walled sleeve, and also sleeves with an actual plate or plate holder, to which a typically flexible printing plate is applied. Also known are sleeves where the plates are engraved directly into the outer surface, e.g. by laser, or applied in some other way. Furthermore sleeves are known whose surfaces serve as a cushioning, intermediate layer to accommodate comparatively rigid printing plates with the actual printing plate. The present invention is fundamentally applicable both to the first two sleeve types and to the two last mentioned types.

The sleeves are usually slid onto the carrier body, i.e. the printing press cylinder, by generating an air cushion between the sleeve and the cylinder. To this end, the printing press cylinder typically has air outlet openings on its surface that are only pressurised to mount and dismount the sleeve. The sleeves are designed to be expandable to this purpose, i.e. with an expandable inside diameter. Multi-layer sleeves have found widespread use in this context, in order to guarantee stability during operation, and particularly slip-free fixing on the cylinder by means of a non-rotating, frictional connection, despite the expandable inside diameter.

A multi-layer sleeve designed specifically for flexographic printing is known from European Patent Application EP 1 361 073, for example. This sleeve encompasses, in a typical design, an inner layer with an inner jacket of comparatively high strength and/or surface hardness that permits frequent mounting and dismounting. The inner jacket is nevertheless elastically expandable to a minimum degree for mounting and dismounting. Expandability is additionally enabled, in wholly conventional manner, by a compressible layer being specially provided, radially outside the inner jacket. The compressible layer is customarily a relatively thin-walled layer of foamed polymer and permits reversible expansion of the inner jacket. The sleeve according to EP 1 361 073 has an intermediate layer on the outside of the compressible layer. The customary intermediate layer determines the wall thickness or the overall diameter of the sleeve and is designed with a corresponding thickness. Particularly in the case of relatively large wall thicknesses, the intermediate layer should be made of the lightest possible material, such as foamed polyurethane. According to the conventional design, as also proposed in EP 1 361 073, the intermediate layer is, in contrast to the compressible layer, designed to be as rigid as possible, i.e. radially incompressible. The intermediate layer is then followed by an outer layer. The latter, in turn, typically has an outer jacket that has the hardest possible surface and is usually not expandable.

With the aim of increasing the service life and surface quality (TIR), U.S. Patent Application US 2002/0046668 proposes a multi-layer, expandable sleeve that comes entirely without a conventional compressible layer. The compressible layer is eliminated in that, as a result of an appropriate design, the intermediate layer itself permits a certain degree of elastic expansion of the inner jacket, e.g. in the range of approx. 4 to approx. 12 hundredths of a millimeter. For an intermediate layer of this kind, US 2002/0046668 recommends a special polyurethane with a Shore D hardness between approx. 45 and 50.

Patent Specification EP 0 683 040 likewise discloses a sleeve without a compressible layer on the inner jacket. The sleeve according to EP 0 683 040 also displays a multi-layer structure with an inner and outer jacket and an intermediate layer. Apart from the absence of a separate compression layer, this sleeve has—with a view to saving weight and in contrast to US 2002/0046668—an intermediate layer of special, lightweight honeycomb design with radially oriented honeycomb webs (see FIG. 3). This intermediate layer comprises layers of matting/resin composite, between which at least one hexagonal honeycomb structure is formed, consisting of cured polymer resin. The hexagonal structure is produced integrally from polymer resin. To this end, a strip of special matting that is specifically suitable for this purpose with impressed channels and which does not itself absorb resin during impregnation, is wound around the matting layers in spiral fashion. The matting layers and the channels in the special strip are subsequently coated with resin, such that the matting layers are impregnated and the hexagonal channel structure is filled with resin. After curing, this results in a special sandwich structure with honeycomb webs consisting exclusively of polymer resin. These webs form bridges between the matting/resin face layers. According to EP 0 683 040, pillar-like resin bridges are additionally provided within the non-impregnated hexagonal cells made of matting. They are produced by radial holes in the special matting, distributed around the circumference, which are likewise filled with resin. According to EP 0 683 040, the special design of the intermediate layer itself, with hexagonal webs and supports made of resin between the matting/resin composite layers, is essential so that the inner jacket can expand radially away from the longitudinal axis. According to EP 0 683 040, several hundredths of a millimeter, i.e. at least 20 µm, expansion in the radial direction are said to be guaranteed.

The disadvantages of a sleeve according to EP 0 683 040 are at least the relatively complex process and the nevertheless comparatively high density i.e. volumetric weight of the special intermediate layer.

OBJECT OF THE INVENTION

It is thus an object of the present invention to propose a sleeve and a corresponding manufacturing method that permit further weight reduction compared to known sleeves. Additionally or alternatively, the complexity of the process for manufacturing a sleeve with a lightweight intermediate layer is to be reduced, particularly when compared to EP 0 683 040.

These objects are achieved by a sleeve and a method according to the invention.

GENERAL DESCRIPTION OF THE INVENTION

The invention relates to a multi-layer, expandable sleeve comprising an inner layer with an inner jacket having a wear-resistant, hard surface, preferably made of a composite fibre material, that defines a cylindrical or conical cavity corresponding to the printing press cylinder. The sleeve furthermore encompasses an intermediate layer generally designed as a lightweight honeycomb structure, particularly with honeycomb cells whose central axes are oriented as radially as possible. In the known manner, the intermediate layer determines the overall diameter of the sleeve and can be designed with a correspondingly variable thickness. An outer layer is provided on the outside of the intermediate layer. Said outer layer has a cylindrical, compression-proof outer jacket, preferably made of a composite fibre material. The outer jacket serves, for example, to carry an outer shell, a printing plate or a separate outer sleeve (sleeve as an adapter sleeve).

According to the invention, the aforementioned object is achieved in that the intermediate layer comprises at least one honeycomb layer with a shaped cured composite-fibre honeycomb made of fibre material embedded in a resin matrix. The intermediate layer typically has a greater thickness (radial dimension) than the inner layer or outer layer for example, and preferably includes several such honeycomb layers.

Surprisingly, even an intermediate layer of this kind with honeycomb layers makes it possible for the inner jacket to be expanded radially away from the longitudinal axis for mounting the sleeve on the cylinder, and particularly permits expansion in the radial direction of several hundredths of a millimeter, at least 10 µm, preferably at least 20 µm. Use of an additional compression layer as an auxiliary measure is possible, if so desired, but not necessary. Weight savings are achieved by, inter alia, the low density of the honeycomb layers.

The use of composite-fibre honeycomb is in itself known in the field of press rollers. Up to now, however, the use of honeycomb was only proposed for applications where compressibility in the radial direction is to be minimised, not enabled, owing to the relatively high strength in the web direction that is typical for honeycombs, e.g. on the multi-layer cutting roller from DE 100 18 418 with an intermediate layer made of lightweight CFRP or GFRP honeycomb material.

Contrary to expectations, however, a structure of the intermediate layer using shaped cured composite-fibre honeycomb, i.e. honeycomb made of fibre material embedded in a resin matrix, is also capable of achieving at least a major portion of the necessary compressibility through the intermediate layer itself (much like the more elaborate and heavier structure according to EP 0 683 040).

The invention also relates to a method for manufacturing the sleeve according to the invention.

BRIEF DESCRIPTION OF THE DRAWINGS

Further details and advantages of the invention can be taken from the following, more detailed description of possible embodiments of the invention on the basis of the enclosed drawings. The not-to-scale drawings. show the following in schematic form.

DETAILED DESCRIPTION BASED ON THE DRAWINGS

Figure 1:
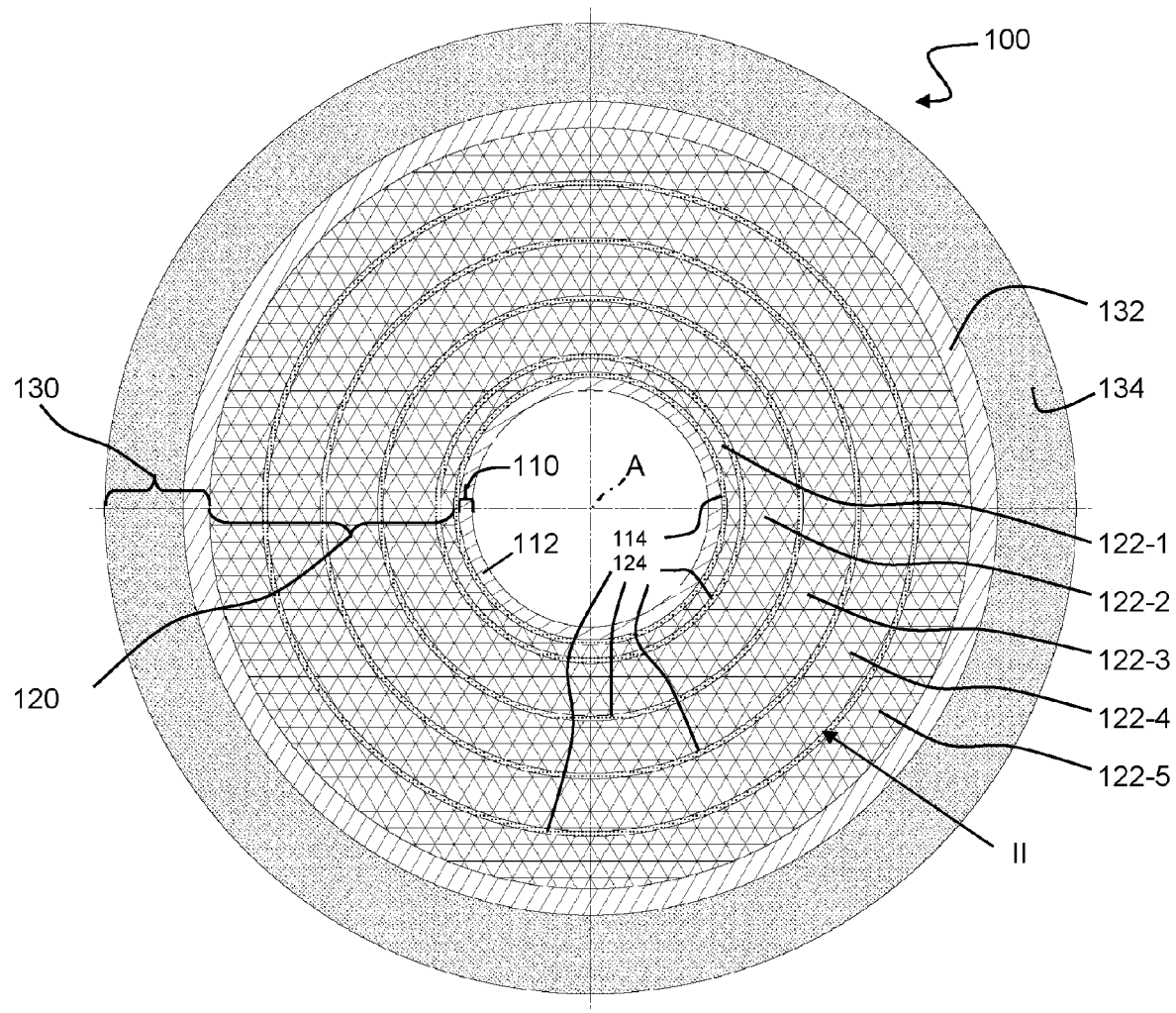
FIG. 1 a cross-section of a first embodiment of an expandable sleeve with multi-layer structure, particularly suitable for large outside diameters.

FIG. 1 shows a first embodiment of an expandable sleeve, generally referred to as 100, in a cross-section at right angles to its longitudinal axis A. Sleeve 100 has multiple layers and comprises, consecutively from the inside outwards, an inner layer 110, an intermediate layer 120 and an outer layer 130.

In the embodiment according to FIG. 1, inner layer 110 consists of a generally rotationally symmetrical inner jacket 112, made of a multi-layer GFRP composite fibre material. Inner jacket 112 has a hard surface, i.e. is sufficiently wear-resistant for a given number of mounting and dismounting procedures. Inner jacket 112 is in itself not appreciably compressible, but its inside diameter can be elastically expanded by several hundredths of a millimeter, particularly when pressurised with compressed air in the pressure range typical for flexographic printing. As a rotational and hollow body, inner jacket 112 defines longitudinal axis A of sleeve 100, as well as the inner cavity by means of which sleeve 100 is mounted on the cylinder of a rotary press, particularly the compressed-air cylinder of a flexographic press, by expansion with compressed air. The terms "cylinder" and "cylindrical" are to be interpreted in the broadest sense here, i.e. inner jacket 112 can have not only the known circular cylindrical geometry, but also a conically tapered geometry. Compared to the cylinder of the printing press, inner jacket 112 often has a predefined, slight undersize, such that, when the compressed air is shut off, a slip-free frictional connection is ensured on the cylinder. Further details regarding the suitable design of inner jacket 112 and inner layer 110 are prior art, e.g. according to the literature indicated in the introduction, and are thus not explained in more detail.

Like inner layer 110, outer layer 130 can also display an essentially conventional structure in itself. In the embodiment according to FIG. 1, outer layer 130 has a hard surface, compression-proof outer jacket 132 made of composite fibre material, preferably multiple layers of GFRP. In contrast to inner jacket 112, outer jacket 132 should preferably not be appreciably deformable when exposed to normal stresses from the inside or the outside. This is particularly achieved by a suitable combination of resin and fibre material in outer jacket 132. For example, compared to inner jacket 112, outer jacket 132 can display more layers than inner jacket 112 and/or a different fibre material, such as a different fabric, or a less expansible combination of different fibre material types, etc. Outer layer 130 according to FIG. 1 furthermore has an external outer shell 134 made of a hard, chemically resistant material, preferably polyurethane or a material with the same property profile. Outer shell 134 displays a technically circular-cylindrical outer surface about longitudinal axis A and is correspondingly machined, e.g. cylindrically turned, where appropriate. Outer shell 134 is attached to outer jacket 132. To this end, a thin, outer honeycomb layer (not shown) can optionally be attached to outer jacket 132 to improve connection, similar to the innermost honeycomb layer described further below, to which outer shell 134 made of polyurethane is applied. Outer shell 134 likewise has a hard surface and is compression-proof. Alternatively to this, an elastic shell, e.g. made of rubber-like material, a separate outer sleeve, i.e. for use of sleeve 100 as an adapter sleeve, or directly the printing plate itself, for example, can be applied to outer jacket 132. However, the embodiment according to FIG. 1, with outer shell 134 made of polyurethane, is preferred for flexographic printing. In the known manner, outer shell 134 thus forms the plate or plate holder for interchangeable attachment of a flexible plate. Suitable retaining means (not shown in detail) for flexographic printing plates, e.g. a milled retaining slit, can be provided in or on outer shell 134. Further details regarding the suitable design of an outer layer 130 are known from the prior art.

FIG. 1 furthermore schematically shows the structure of intermediate layer 120 according to one aspect of the invention. Intermediate layer 120 is cylindrical and made of lightweight honeycomb material, particularly in multi-layer form with several layers of honeycomb material. Intermediate layer 120 is attached to inner layer 110, on inner jacket 112 according to FIG. 1, for example, preferably by means of a suitable adhesive layer 114. In contrast, outer layer 130 can be attached to intermediate layer 120 made of honeycomb material either directly, e.g. by winding impregnated fibre material, or additionally by a separate adhesive layer.

Figure 2:
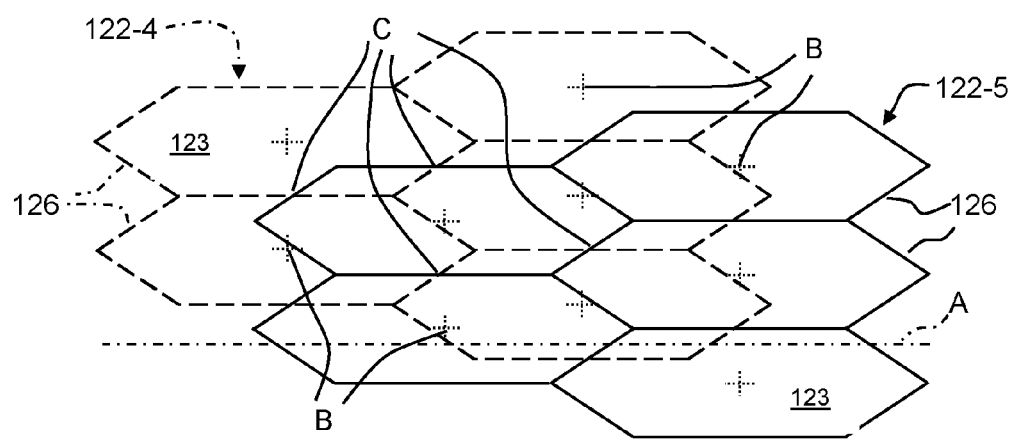
FIG. 2 a schematic side view in the radial direction according to arrow II in FIG. 1, illustrating the arrangement of two adjacent honeycomb layers in an intermediate layer of the sleeve according to FIG. 1.

As can best be seen from FIG. 2, honeycomb cells 123 of the individual layers of intermediate layer 120 are arranged in such a way that their central axes B (transverse to the plane of FIG. 2) are oriented essentially radially to longitudinal axis A. Thus, central axes B radiate from longitudinal axis A in a star-shaped arrangement, preferably in the plane of FIG. 1. In the unshaped flat state, a central axis B corresponds to the axis of symmetry of honeycomb cell 123 in the direction of the honeycomb thickness parallel to the cell walls. Owing to the curvature-induced expansion of honeycomb cells 123 (see below), the cells walls, i.e. honeycomb webs 126, are not exactly parallel to central axis B, but are likewise essentially radial. FIG. 2 shows an idealised, schematic view without corresponding curvature, Of course, curvature-induced deformations and a lesser degree of symmetry in the cross-section of honeycomb cells 123 according to FIG. 2 cannot be avoided in practice.

As can be seen from FIG. 1 and FIG. 2, intermediate layer 120 is made of several, adjacent honeycomb layers 122-1, 122-2, 122-3, 122-4, 122-5. Every single honeycomb layer 122-1, 122-2, 122-3, 122-4, 122-5 of intermediate layer 120 is manufactured according to the invention, with shaped cured fibre composite honeycomb made of fibre material embedded in a resin matrix. In this context, the term "shaped cured" means that the individual honeycombs of each honeycomb layer 122-1, 122-2, 122-3, 122-4, 122-5 already form an actual fibre composite, i.e. are cured before being placed on top of each other during production of intermediate layer 120. Moreover, the term "honeycomb" is not used here to denote a single (honeycomb) cell, but the coherent structure of cells. The fibre composite honeycombs of each honeycomb layer 122-1, 122-2, 122-3, 122-4, 122-5 can, in principle, be manufactured from any suitable combination of glass fibres, carbon fibres, aramid fibres, or mixtures thereof, with epoxy resins, vinyl ester resins, polyester resins, phenolic resins or other types of resin, including hybrid resins, where appropriate. However, honeycomb made of aramid fibre paper, particularly of Nomex® paper, in conjunction with phenolic resin (e.g. of the Euro-Composites® ECA/ECA-R type) is particularly preferred for weight and cost optimisation. As can furthermore be seen from FIG. 1, honeycomb layers 122-1, 122-2, 122-3, 122-4, 122-5 are directly attached to each other, on top of each other and between each other, by means of intermediate adhesive layers 124, coaxially to axis A. Suitable for adhesive layers 124 is, for example, adhesive film based on epoxy resin or of thermoplastic adhesive. Adhesive layers 124 preferably have a weight per unit area of <500 g/m² and preferably consist of pure, cured adhesive, e.g. resin without fibre reinforcement, in order to guarantee a minimum of elastic deformation. In other words, in contrast to the prior art, no sandwich-typical face layers of fibre composite are provided in the circumferential direction within intermediate layer 120, but pure, non-reinforced adhesive layers 124, e.g. of epoxy resin or thermoplastic material. This has proven to be advantageous for expansion of inner layer 110 and is presumably decisive in this respect.

Despite the characterising application of fibre composite honeycomb to achieve high resistance to compression in the direction of central axes B of honeycomb cells 123, the structure of intermediate layer 120 proposed here is surprisingly capable of achieving sufficient expansion of inner layer 120 and of inner jacket 122 of several hundredths of a millimeter in the radial direction, particularly of more than 30 μm. This property is presumably attributable to production-related effects, such as the expansion of honeycomb cells 123 in the radial direction, and also to their direct connection to each other by means of non-reinforced adhesive layers 124.

Ideal values were obtained in an embodiment schematically illustrated in FIG. 2. In this instance, two radially adjacent pairs of honeycomb layers, 122-1/122-2, 122-2/122-3, 122-3/122-4 and 122-4/122-5 (the latter pair is shown in FIG. 2), are in each case arranged in such a way that central axes B of honeycomb cells 123 of outer honeycomb layer 122-5 are, as far as possible, offset relative to the central axes of the honeycomb cells of adjacent inner honeycomb layer 122-4, at least over a material portion of the circumference, viewed around longitudinal axis A. In other words, alignment of central axes B between two immediately adjacent honeycomb layers 122-1/122-2, 122-2/122-3, 122-3/122-4 or 122-4/122-5 is avoided to the extent technically possible in the framework of production. Alignment of this kind can be technically avoided relatively easily, at least over a portion of the circumference exceeding 75% of the circumference on the statistical average. In contrast, alignment between non-adjacent honeycomb layers, e.g. innermost honeycomb layer 122-1, middle honeycomb layer 122-3 and/or outer honeycomb layer 122-5, is perfectly permissible, irrelevant, and sometimes even advantageous. Applying appropriate precision during production, manufacturing is preferably performed in such a way that, as illustrated in FIG. 2, the honeycombs in pairs of radially adjacent honeycomb layers, e.g. 122-4/122-5, are offset in such a way that cell webs 126, i.e. the radially oriented cell walls, of honeycomb cells 123 of inner honeycomb layer 122-4 (shown in FIG. 2) support cell webs 126 of outer honeycomb layer 122-5 centrally within the bounds of the technically feasible. Put another way, in a radial side view according to FIG. 2, adjacent cell webs 126 are supposed to intersect as centrally as possible. As a result, cell webs 126 typically bear loads at four points each, as exemplified in C in FIG. 2 (similar to a four-point bearing). For manufacturing reasons, it is, of course, impossible to completely rule out slight, unintentional alignment over limited angular ranges (sectors about longitudinal axis A). Equally, central load bearing of cell webs 126 on each other cannot be exactly guaranteed. On average, the arrangement of two adjacent honeycomb layers, e.g. 122-4/122-5, can and should, however, for the greater part display the above-mentioned offset or central load bearing, rather than alignment of central axes B and cell webs 126. This preferred arrangement additionally improves the already surprising radial compressibility of intermediate layer 120 towards the outside, which guarantees the expandability of inner layer 110. The pairwise non-aligned arrangement obviously requires that the pairs of adjacent honeycomb layers, e.g. 122-2/122-3, 122-3/122-4 and 122-4/122-5, each be manufactured from fibre composite honeycomb of identical cell size. As a result and despite expansion towards the outside, the cell cross-section of adjacent honeycomb cells 123 coincides almost exactly at their interface, i.e. at the level of adhesive layer 124 between them.

Figure 5:
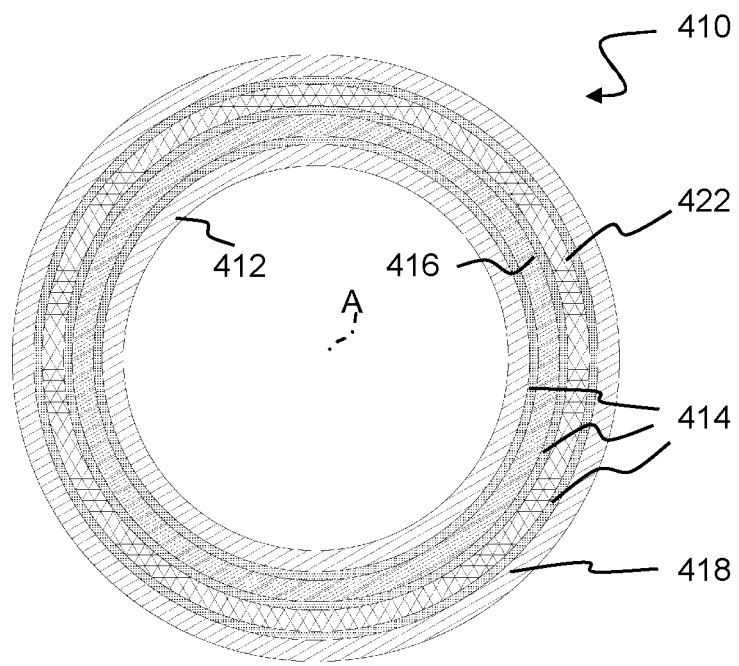
FIG. 5 a cross-section of an alternative inner layer for use in a sleeve according to FIG. 4.
Figure 6:
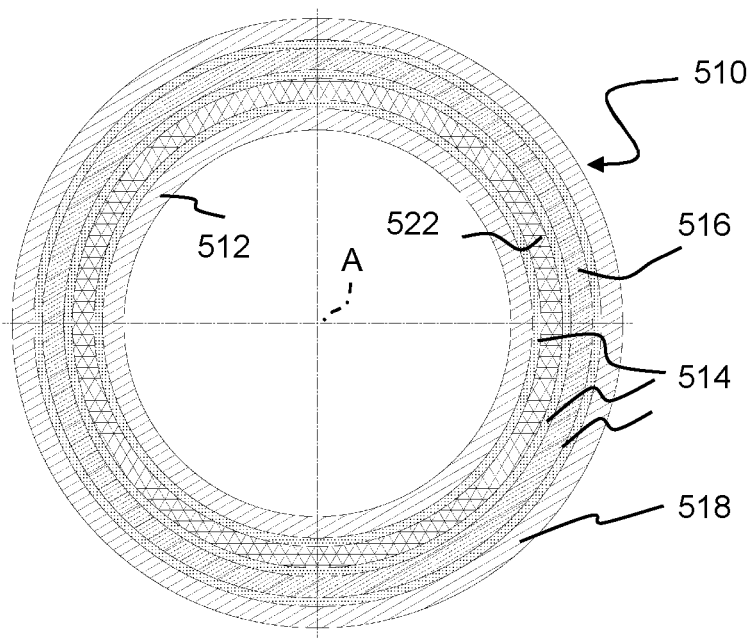
FIG. 6 a cross-section of a further, alternative inner layer for use in a sleeve according to FIG. 4.

It should furthermore be noted that intermediate layer 120 preferably displays an innermost honeycomb layer 122-1 made of shaped cured fibre composite honeycomb with hexagonal honeycomb cells (not shown in more detail). Thus, unlike honeycomb cells 123 of the further outer honeycomb layers 122-2, 122-3, 122-4, 122-5, shown in FIG. 2, innermost honeycomb layer 122-1 has no overexpanded honeycomb cells. In contrast, honeycomb cells 123 of the further outer honeycomb layers 122-2, 122-3, 122-4, 122-5 are overexpanded, preferably in the direction of longitudinal axis A, i.e. at least not regularly hexagonal, as schematically illustrated in FIG. 2. Not shown in more detail in FIG. 2 is the preferred embodiment with honeycomb cells 123 that are completely overexpanded (in the W or L direction), i.e. overexpanded into a quasi-rectangular cross-section ("overexpanded rectangular core", e.g. of the Euro-Composites® ECA-R type). Corresponding overexpansion of the fibre composite honeycomb before its curing greatly facilitates its subsequent bending into the cylindrical jacket shape about axis A, and reduces the associated warping. Furthermore, the embodiment according to FIG. 1 displays the preferred characteristic that innermost honeycomb layer 122-1, made of hexagonal honeycomb, displays a substantially smaller thickness (dimension in the radial direction), compared to the further outer honeycomb layers 122-2, 122-3, 122-4, 122-5. A thickness of innermost honeycomb layer 122-1, made of hexagonal honeycomb, of less than 10%, preferably less than 7.5%, of the total thickness of intermediate layer 120 emerged in experiments. In order to guarantee practicable bending of innermost honeycomb layer 122-1, made of hexagonal honeycomb, and given customary inside diameters of sleeve 100, said innermost honeycomb layer 122-1 preferably has a thickness of less than 7.5 mm, preferably 5 mm, in absolute terms. Hexagonal honeycomb in a thin innermost honeycomb layer 122-1 is particularly preferred together with an auxiliary layer of foamed polymer, as described further below (FIGS. 5, 6). An arrangement comprising a thin, relatively more stable innermost hexagonal honeycomb layer 122-1 and an adjacent, overexpanded honeycomb layer 122-2 according to FIG. 1 is apparently also beneficial to expansion, this possibly being attributable to favourable bending properties at the points of intersection of the hexagonal and overexpanded honeycomb webs 126.

Not to be seen in more detail from FIG. 1 is the preferred embodiment according to which intermediate layer 120 comprises honeycomb layers 122-1, 122-2, 122-3, 122-4, 122-5 of at least three different thicknesses, increasing towards the outside. For instance, inner honeycomb layer 122-1 can display a thickness of approx. 1.5-3.5 mm, the thickness of outer honeycomb layers 122-2, 122-3, 122-4, 122-5 being in the range 7.5-12.5 mm, 12.5-17.5 mm and 17.5-25 mm in each case, in which context the two middle honeycomb layers 122-3, 122-4, for example, can display the same thickness of 12.5-17.5 mm. Similarly, instead of a layer 122-5 in the range from 17.5 mm to 25 mm, it is also possible to provide a plurality of identical layers, e.g. four to seven such layers, depending on the required outside diameter. Fine-tuning of the overall thickness of intermediate layer 120 can be achieved by again applying appropriately selected honeycomb layers of lesser thickness on the outside of the one or more thickest layers (see example below).

Figure 3:
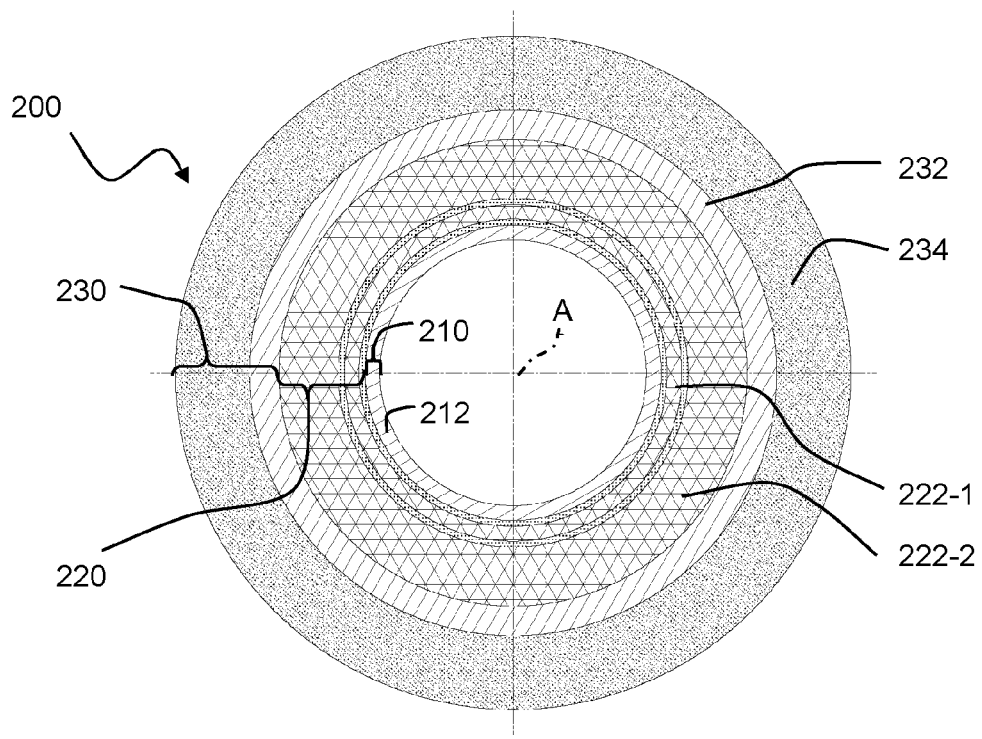
FIG. 3 a cross-section of a second embodiment of an expandable sleeve with multi-layer structure, particularly suitable for smaller outside diameters.

FIG. 3 shows a generic sleeve 200 according to a second embodiment. Like the embodiment in FIG. 1, it has no separate compression layer, as customarily used. In this embodiment, too, the sleeve has a multi-layer structure with an inner layer 210, comprising a GFRP inner jacket 212, an intermediate layer 220 and a relatively rigid outer layer 230 with an outer jacket 232 and a polyurethane outer shell 234. Sleeve 200 essentially differs in that a smaller number of honeycomb layers is present, e.g. merely two honeycomb layers 222-1, 222-2, as illustrated, where innermost honeycomb layer 222-1 is preferably relatively thin, particularly having a thickness <<10 mm, and manufactured from hexagonal honeycomb, and outer honeycomb layer 222-2 is relatively thick, e.g. having a thickness >15 mm, and manufactured from completely overexpanded honeycomb (e.g. of the Euro-Composites® ECA-R type). Apart from having different diameters, the structure of inner layer 210 and outer layer 230 can correspond to the above description. What was said above similarly applies to the structure of individual honeycomb layers 222-1, 222-2. In the embodiment according to FIG. 3, too, intermediate layer 220, made of shaped cured fibre composite honeycomb, in itself thus contributes essentially to inner jacket 212 being able to expand radially away from longitudinal axis A for mounting sleeve 200 on a printing press cylinder. An intermediate layer 220 with a relatively thin overall thickness likewise permits expansion of at least 20 μm (2 hundredths of a millimeter) in the radial direction.

Figure 4:
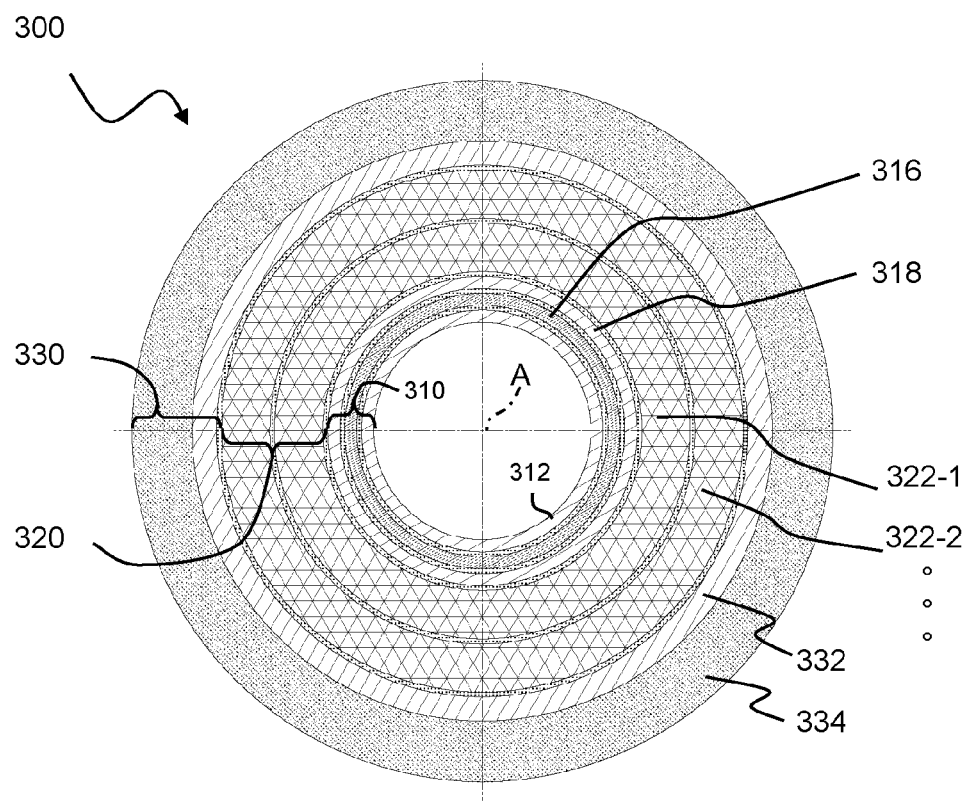
FIG. 4 a cross-section of a further embodiment of an expandable sleeve with multi-layer structure, as an alternative to FIG. 1.

FIG. 4 shows a further embodiment of a sleeve 300 as an alternative to FIG. 1. Sleeve 300 essentially differs as regards the structure of its inner layer 310. Although illustrated differently, intermediate layer 320 can be essentially structured as described above in relation to FIG. 1 or, however, without a thin innermost layer (see FIG. 1, Ref. 122-1) and/or with a different arrangement of honeycomb layers 322-1, 322-2, 322-3. Outer layer 330 is designed as described above for use in flexographic printing.

In contrast, inner layer 310 according to FIG. 4 comprises, in addition to the hard surface inner jacket 312 described above and from the inside outwards, a compressible auxiliary layer 316 and, for manufacturing reasons, an intermediate jacket 318. Compared to outer jacket 332, intermediate jacket 318 is likewise relatively elastic, e.g. made of fibre composite, preferably of just a few layers of GFRP, in order to permit the required expansion. Intermediate layer 320 according to the invention is produced and attached on intermediate jacket 318. Auxiliary layer 316 according to FIG. 3 consists of compressible material, particularly a foamed polymer with a density in the range of 25-40 kg/m³. An elastomer or a foam type with the most durable possible preservation of >90% resilience is preferred.

An embodiment with auxiliary layer 316 according to FIG. 4 is preferred, particularly if, in addition to the essential contribution made by intermediate layer 320, an additional contribution to the expansibility of inner jacket 312 is required or, for example, the non-slip frictional connection on the cylinder is to be specifically influenced by means of suitable selection of the material of auxiliary layer 316. Compared to intermediate layer 320, auxiliary layer 316 makes a smaller contribution (<50%), also in the embodiment of sleeve 300 according to FIG. 4, to radial expansion in relation to longitudinal axis A in absolute terms (not in relation to length). Thus, in the embodiment according to FIG. 4, too, >50% of the expansion in the radial direction in absolute terms is absorbed by intermediate layer 320, e.g. on the basis of a structure according to FIG. 1. Accordingly, the contribution of intermediate jacket 318 to expansibility is preferably <50%.

FIGS. 5 and 6 show preferred alternatives for an inner layer 410, 510 with a compressible auxiliary layer, which can particularly also be incorporated separately into structures according to FIG. 1, FIG. 3 or FIG. 4 as an inner layer. In this context, said structures then display an inner jacket 112, 212 or an intermediate jacket 314 of lesser thickness and an oversize corresponding to the diameter of the inner layer according to FIG. 5 or FIG. 6, plus an assembly gap of approx. 0.1-0.5 mm for bonding.

Inner layer 410 according to FIG. 5 comprises, from the inside outwards, a hard surface inner jacket 412, a compressible auxiliary layer 416, particularly made of an elastomer or foamed polymer, as above, and a thin honeycomb layer 422. Thin honeycomb layer 422 is attached adjacent to compressible auxiliary layer 416, i.e. the foamed polymer, by means of a suitable, non-reinforced, elastically deformable adhesive layer 414. Thin honeycomb layer 422 is particularly manufactured from shaped cured fibre composite honeycomb, preferably with hexagonal honeycomb cells having a thickness ≤7.5 mm. For manufacturing purposes, inner layer 410 additionally comprises an outer intermediate jacket 418, preferably made of composite fibre material, which can be designed to be of comparatively small thickness, such that, when bonded together with a further intermediate jacket, e.g. 318 in FIG. 4, it does not impair the essential contribution to expansion in the radial direction of the intermediate layer, e.g. 320 in FIG. 4. A polyurethane-based or epoxy resin-based paste adhesive is preferred as adhesive layer 414, applied adjacent to auxiliary layer 416 made of an elastomer or a foamed polymer.

The structure of inner layer 510 according to FIG. 6 is identical, apart from the sequence from the inside outwards, where thin honeycomb layer 522 is provided on the inside, and compressible auxiliary layer 516 on the outside in FIG. 6.

Compared to inner layer 310 according to FIG. 4, for example, use of an inner layer 410; 510 according to FIG. 5 or FIG. 6 permits an increase in the possible compression or a lesser thickness of compressible auxiliary layer 416; 516, since the latter can, particularly when using foam material, at least slightly escape into the open honeycomb cells of thin honeycomb layer 422; 522.

Possible manufacturing methods for sleeves 100; 200; 300, with intermediate layer 120; 220; 320 and/or inner layer 310; 410; 510 according to the invention, are described below on the basis of preferred exemplary embodiments:

As a general overview, the method for manufacturing a multi-layer, expandable sleeve typically comprises Steps A) to C), as follows:

A) production of an inner layer 110; 210; 310 with a hard surface inner jacket 112; 212; 312, preferably from composite fibre material, on a mandrel defining a longitudinal axis, preferably by means of application, preferably by winding, of dry or resin-impregnated fibre material on the mandrel in one or more layers, impregnation of the fibre material with resin by vacuum infusion, or by the wet-winding technique directly during winding, curing of the impregnated fibre material to obtain a hard surface inner jacket;

B) production of an intermediate layer 120; 220; 320 in the form of a lightweight honeycomb, with honeycomb cells whose central axes are oriented radially to the longitudinal axis by application of an adhesive layer 124; 224; 324, particularly on the produced inner layer 110; 210; 310;

application of at least one honeycomb layer 122-i; 222-i; 322-i, made of previously cured fibre composite honeycomb consisting of fibre material embedded in a resin matrix, coaxially to longitudinal axis A, where fibre composite honeycomb layer 122-i; 222-i; 322-i is shaped during application or beforehand for bending it into curvature about longitudinal axis A. In this context, the cell sizes of the honeycombs are preferably in the range from 3.2 to 6.4 mm. The densities of the honeycomb layers are preferably in the range from 38 to 52 kg/m$^3$. Phenolic resin-impregnated aramid fibre honeycomb is preferably used as the honeycomb material (e.g. ECA honeycomb from Euro-Composites® S.A.). Bonding of the honeycomb layers by the adhesive layers is performed in an oven cycle at 50 to 160° C., depending on the adhesive type used.

C) production of an outer layer 130; 230; 330 with a hard surface, cylindrical outer jacket 132; 232; 332, preferably made of composite fibre material, on intermediate layer 120; 220; 320, preferably by application, e.g. by winding, of fibre material pre-impregnated with resin, preferably epoxy resin or vinyl ester resin, in one or more layers, indirectly or directly on the intermediate layer, particularly on the outer honeycomb layer, and curing of the pre-impregnated fibre material to obtain a hard surface outer jacket, application of an outer, hard layer made of chemically resistant material, preferably polyurethane or a material with a similar property profile, by suitable application methods (e.g. casting, spraying or spin coating).

As an alternative to manufacturing intermediate layer 320 directly on the complete inner layer 310, it is also possible to manufacture intermediate layer 320 on a first intermediate jacket 318, into which a separate inner layer 410; 510 according to FIG. 4 or FIG. 5 is subsequently bonded. In this case, inner layer 410; 510 is thus produced separately and independently in terms of time. This procedure particularly permits the production of modular intermediate layers 120; 220; 320, which can be provided with an inner jacket of the required diameter. Similarly, outer layer 130; 230; 330 can comprise, in addition to compression-proof outer jacket 132; 232; 332 and possibly outer shell 134; 234; 334, one or more inner spacer layers, subsequently applied to a modular intermediate layer 120; 220; 320, particularly also made of shaped cured fibre composite honeycomb.

Finally, it should once again be noted that, according to the invention, the use of at least one honeycomb layer made of shaped cured fibre composite honeycomb, e.g. according to FIG. 1, FIGS. 3-4, or also FIGS. 5-6, achieves simplified manufacturing and low weight. Furthermore, while achieving low weight, an intermediate layer is made possible that permits significant expansion in the radial direction, particularly expansion by at least 20 μm.

| Legend | |
|---|---|
| FIGS. 1, 2 | |
| A | longitudinal axis |
| B | central axes |
| 100 | sleeve |
| 110 | inner layer |
| 112 | inner jacket |
| 114 | adhesive layers |
| 120 | intermediate layer |
| 122-1, 122-2, 122-3, 122-4, 122-5, | honeycomb layers |
| 123 | honeycomb cells |
| 124 | adhesive layers |
| 126 | cell webs |
| 130 | outer layer |
| 132 | outer jacket |
| 134 | outer shell |
| FIG. 3 | |
| A | longitudinal axis |
| 200 | sleeve |
| 210 | inner layer |
| 212 | inner jacket |
| 220 | intermediate layer |
| 222-1, 222-2, | honeycomb layers |
| 230 | outer layer |
| 232 | outer jacket |
| 234 | outer shell |
| FIG. 4 | |
| A | longitudinal axis |
| 300 | sleeve |
| 310 | inner layer |
| 312 | inner jacket |
| 316 | auxiliary layer |
| 318 | intermediate jacket |
| 320 | intermediate layer |
| 322-1, 322-2, 322-3 | honeycomb layers |
| 330 | outer layer |
| 332 | outer jacket |
| 334 | outer shell |
| FIG. 5 | |
| 410 | inner layer |
| 412 | inner jacket |
| 414 | adhesive layer |
| 416 | auxiliary layer |
| 418 | intermediate jacket |
| 422 | honeycomb layer |
| FIG. 6 | |
| 510 | inner layer |
| 512 | inner jacket |
| 514 | adhesive layer |
| 516 | auxiliary layer |
| 518 | intermediate jacket |
| 522 | honeycomb layer |

The invention claimed is:

1. A multi-layer, expandable sleeve for a printing press cylinder, in particular for flexographic printing, wherein the sleeve comprises, from the inside outwards, at least:
a hard surface inner jacket made of composite fiber material that defines a longitudinal axis and a cavity for mounting the sleeve on the printing press cylinder;
an intermediate layer manufactured in the form of a lightweight honeycomb with honeycomb cells whose central axes are oriented radially to the longitudinal axis; and
a compression-proof outer jacket made of composite fiber material and configured to carry an outer shell, a printing plate or a separate outer sleeve,
wherein the intermediate layer, between the hard surface inner jacket and the compression-proof outer jacket, itself makes an essential contribution to the inner jacket being capable of expanding radially away from the longitudinal axis for mounting the sleeve on the printing press cylinder and permitting expansion of at least 20 μm in the radial direction, and
wherein the intermediate layer comprises at least one honeycomb layer consisting of shaped fiber composite honeycomb made of fiber material embedded in a resin matrix that has been previously cured.

2. The multi-layer, expandable sleeve according to claim 1, wherein the intermediate layer comprises at least two honeycomb layers each of which is manufactured from shaped cured fiber composite honeycomb and attached coaxially to the longitudinal axis, one on top of the other, by non-reinforced adhesive layers.

3. The multi-layer, expandable sleeve according to claim 2, wherein two radially adjacent honeycomb layers are arranged such that central axes of honeycomb cells of the outer honeycomb layer are offset relative to central axes of honeycomb cells of the adjacent inner honeycomb layer over a material portion of a circumference.

4. The multi-layer, expandable sleeve according to claim 3, wherein the two radially adjacent honeycomb layers are manufactured from fiber composite honeycomb of the same cell size and the central axes are offset such that cell webs of the inner honeycomb layer bear cell webs of the outer honeycomb layer essentially centrally.

5. The multi-layer, expandable sleeve according to claim 2, wherein the intermediate layer comprises:
a thinner, innermost honeycomb layer made of shaped cured fiber composite honeycomb with hexagonal honeycomb cells, and
at least one thicker, outer honeycomb layer made of shaped cured fiber composite honeycomb with honeycomb cells overexpanded in the direction of the longitudinal axis.

6. The multi-layer, expandable sleeve according to claim 5, wherein the thinner, innermost honeycomb layer displays a thickness of <7.5 mm.

7. The multi-layer, expandable sleeve according to claim 2, wherein the intermediate layer comprises honeycomb layers of at least three different thicknesses, increasing towards an outside.

8. The multi-layer, expandable sleeve according to claim 1, wherein all honeycomb layers of the intermediate layer are manufactured from shaped cured honeycomb made of aramid fibre paper and phenolic resin.

9. The multi-layer, expandable sleeve according to claim 1, wherein the outer jacket is manufactured from multi-layer, glass fiber-reinforced plastic, and a compression-proof outer layer made of polyurethane is attached on the outer jacket.

10. The multi-layer, expandable sleeve according to claim 1, wherein an inner layer comprises, from the inside outwards,
the hard surface inner jacket, a compressible auxiliary layer made of an elastomer or a foamed polymer, and an intermediate jacket made of composite fiber material;
the hard surface inner jacket, a compressible auxiliary layer made of an elastomer or a foamed polymer, and, adjacent to it, a thin honeycomb layer made of shaped cured fiber composite honeycomb with hexagonal honeycomb cells having a thickness ≤7.5 mm, and an intermediate jacket made of composite fiber material, or the hard surfaced inner jacket, a thin honeycomb layer made of shaped cured fiber composite honeycomb with hexagonal honeycomb cells having a thickness ≤7.5 mm, and, adjacent to it, a compressible auxiliary layer made of an elastomer or a foamed polymer, and an intermediate jacket made of composite fiber material.

11. A method for manufacturing a multi-layer, expandable sleeve for a printing press cylinder, in particular for flexographic printing, the method comprising:

providing an inner layer with a hard surface inner jacket made from composite fiber material, on a mandrel defining a longitudinal axis, by:
applying, by winding of, dry or resin-impregnated fiber material, on the mandrel in one or more layers,
impregnating the fiber material with resin by vacuum infusion or by a wet winding technique directly during winding,
curing the impregnated fiber material to obtain a hard surface inner jacket;

providing an intermediate layer in the form of a lightweight honeycomb, with honeycomb cells whose central axes are oriented radially to the longitudinal axis, by:
applying an adhesive layer on the produced inner layer, and
applying at least one honeycomb layer, made of previously cured fiber composite honeycomb consisting of fiber material embedded in a resin matrix, coaxially to the longitudinal axis, wherein the fiber composite honeycomb is shaped during application or beforehand for bending about the longitudinal axis; and providing an outer layer with a compression-proof outer jacket made of composite fiber material on the intermediate layer, by:
applying, by winding of, fiber material pre-impregnated with resin, in one or more layers, indirectly or directly on the intermediate layer, in particular on the at least one honeycomb layer, and
curing the pre-impregnated fiber material to obtain a compression-proof outer jacket.

12. The method according to claim 11, wherein manufacturing of the intermediate layer comprises:
applying at least two honeycomb layers with intermediate non-reinforced adhesive layers, wherein the honeycomb layers are made of previously cured fiber composite honeycomb consisting of fiber material embedded in a resin matrix and are shaped during application or beforehand for bending about the longitudinal axis; and
attaching each honeycomb layer directly to an adjacent, inner honeycomb layer, or indirectly or directly on the inner layer, by curing the respective non-reinforced adhesive layers between them.

13. The method according to claim 12, wherein at least two honeycomb layers are consecutively applied such that, in two radially adjacent honeycomb layers, central axes of honeycomb cells of the outer honeycomb layer are offset relative to central axes of honeycomb cells of the adjacent inner honeycomb layer over a material portion of a circumference, such that the two radially adjacent honeycomb layers are manufactured from fiber composite honeycomb of the same cell size, and the central axes are offset in such a way that cell webs of the inner honeycomb layer bear cell webs of the outer honeycomb layer essentially centrally.

14. The method according to claim 12, wherein manufacturing of the intermediate layer comprises:
applying a thinner, innermost honeycomb layer made of shaped cured fiber composite honeycomb with hexagonal honeycomb cells, in particular with a thickness of the honeycomb layer of <7.5 mm, and
applying at least one thicker, outer honeycomb layer made of shaped cured fiber composite honeycomb with honeycomb cells overexpanded in the direction of the longitudinal axis on the thinner, innermost honeycomb layer.

15. The method according to claim 12, wherein manufacturing of the inner layer comprises:
applying a thin, innermost honeycomb layer made of shaped cured fiber composite honeycomb with hexagonal honeycomb cells, in particular with a thickness of the honeycomb layer of <7.5 mm, on the inner jacket, and
applying at least one compressible auxiliary layer made of an elastomer or a foamed polymer on the thin, innermost honeycomb layer,
or
applying at least one compressible auxiliary layer made of an elastomer or a foamed polymer on the inner jacket, and
applying a thin, innermost honeycomb layer made of shaped cured fiber composite honeycomb with hexagonal honeycomb cells, in particular with a thickness of the honeycomb layer of <7.5 mm, on the compressible auxiliary layer.

* * * * *